United States Patent [19]

Okamoto et al.

[11] Patent Number: 5,164,428

[45] Date of Patent: Nov. 17, 1992

[54] METHOD FOR THE PRODUCTION OF FINE GRAIN ICE AND DRY CLATHRATE WATER FOR MANUFACTURING OF CONCRETE/MORTAR, A METHOD FOR THE PRODUCTION OF CONCRETE/MORTER BY USING FINE GRAIN ICE OR DRY CLATHRATE WATER AND CONCRETE/MORTAR PRODUCTS MANUFACTURED THEREBY

[75] Inventors: Tadashi Okamoto, Kanagawa; Toru Sato, Chiba; Taiji Kanbayashi, Nara; Chuzo Kato, Tokyo, all of Japan

[73] Assignees: Mitsui Kensetsu Kabushiki Kaisha; Shiiai Kemutekku Kabushiki Kaisha, both of Tokyo; Oosaka Yuuki Kagaku Kogyo Kabushiki Kaisha, Oosaka, all of Japan

[21] Appl. No.: 480,241

[22] Filed: Feb. 15, 1990

Related U.S. Application Data

[62] Division of Ser. No. 337,889, Apr. 14, 1989, abandoned.

[30] Foreign Application Priority Data

Apr. 16, 1988 [JP] Japan .................................. 63-94308

[51] Int. Cl.$^5$ ............................................. C08K 3/36
[52] U.S. Cl. ........................................ 523/307; 523/309; 523/200; 523/202; 524/401; 524/412; 524/560; 524/599; 528/481
[58] Field of Search ............... 523/307, 309, 200, 202; 524/560, 401, 412, 599; 528/481

[56] References Cited

U.S. PATENT DOCUMENTS

| | | | |
|---|---|---|---|
| 4,472,542 | 9/1984 | Nambu | 523/309 |
| 4,501,828 | 2/1985 | Hadermann et al. | 523/309 |
| 4,808,637 | 2/1989 | Boardman et al. | 521/50.5 |

FOREIGN PATENT DOCUMENTS

| | | |
|---|---|---|
| 0241554 | 1/1986 | European Pat. Off. |
| 0191864 | 8/1986 | European Pat. Off. |

Primary Examiner—Paul R. Michl
Assistant Examiner—John J. Guarriello
Attorney, Agent, or Firm—Wenderoth, Lind & Ponack

[57] ABSTRACT

Concrete/mortar is manufactured with a small amount of water by using fine polymer particles containing frozen water. The water becomes available when the particles thaw or the particles may be used directly without freezing.

14 Claims, 2 Drawing Sheets

| ALKYL ESTER | CARBON NUMBER OF ALKYL GROUP | ACRYLIC ESTER | METHACRYLIC ESTER |
|---|---|---|---|
| 2-ETHYLHEXYL | 8 | -85°C | -10°C |
| LAURYL | 12 | +15°C | -65°C |
| LAURYL, TRIDECYL | 12,13 | >+15°C | <-46°C |
| TRIDECYL | 13 | +20°C | -46°C |
| STEARYL | 18 | >+35°C | +38°C |

FIG.I

| SAMPLE NO. | WATER ABSORBENCY (g/g) | | PARTICLE SIZE OF DRY POLYMER (μm) | PARTICLE SIZE WHEN WATER IS ABSORBED (mm) | PARTICLE INDEPENDENCE WHEN WATER IS ABSORBED |
|---|---|---|---|---|---|
| | ION EXCHANGE WATER | 0.9% SALT WATER | | | |
| EXAMPLE-1 | 125 | 33 | 120 | 0.48 | ○ |
| 2 | 110 | 30 | 50 | 0.20 | ○ |
| 3 | 150 | 33 | 170 | 0.62 | ○ |
| 4 | 180 | 35 | 90 | 0.30 | ○ |
| 5 | 200 | 35 | 100 | 0.31 | ○ |
| 6 | 80 | 26 | 120 | 0.45 | ○ |
| COMPARISON EXAMPLE-1 | 540 | 58 | 110 | 0.39 | △ |
| 2 | 160 | 37 | MEASUREMENT IMPOSSIBILITY (THE SECOND CONDENSATION) | MEASUREMENT IMPOSSIBILITY | × |
| 3 | 260 | 42 | 500 | 1.6 | × |

FIG. 2

METHOD FOR THE PRODUCTION OF FINE GRAIN ICE AND DRY CLATHRATE WATER FOR MANUFACTURING OF CONCRETE/MORTAR, A METHOD FOR THE PRODUCTION OF CONCRETE/MORTAR BY USING FINE GRAIN ICE OR DRY CLATHRATE WATER AND CONCRETE/MORTAR PRODUCTS MANUFACTURED THEREBY

This is a divisional of Ser. No. 07/337,889 filed Apr. 14, 1989 now abandoned.

BACKGROUND OF THE INVENTION

This invention relates to a method for the production of fine grain ice or dry clathrate water for manufacturing of concrete/mortar, a method for the production of concrete/mortar by using fine grain ice or dry clathrate water and concrete/mortar products manufactured thereby. Fine grain ice and dry clathrate water for manufacturing of concrete/mortar produced by this invention are used when concrete/mortar is manufactured by use of a small amount of water.

It is possible that concrete/mortar is easily manufactured by making use of fine grain ice or dry clathrate water in places which are difficult to supply with water.

In the case where concrete/mortar is manufactured by a conventional method, much more water is used than the amount of water necessary for hydration of cement in order to uniformly mix and temper cement and water and to keep good flowability as well. However, such method is inconvenient in this method in that strength and durability of concrete/mortar after solidification are lower than the concrete/mortar produced by the use of an amount of water close to theoretical hydration quantity.

For this reason, the technique of mixing cement or cement and aggregate with fine grain ice instead of water has been studied and became known. The features are as follows.

1) Since powder mixture can be performed with cement, mixing can be performed in low water cement ratio.

2) Loss in slump in proportion to the passage of time is small after mixing.

3) The control of temperature for mass concrete can be easily performed.

In the case where this concrete mixing technique is actually applied, however, it is necessary to manufacture fine grain ice and this method is problematic. In a conventional method, fine grain ice is obtained by crushing square ice. In case where fine grain ice is obtained by crushing square ice, the defects are as follows.

1) In case where a large amount of fine grain ice is fed, big plant equipped with special devices such as an ice crusher and a slicer is necessary.

2) Fine grain ice must be kept at low temperature until it is used and an ice storing unit is necessary. Therefore, the control of manufacturing process is troublesome and the cost is high.

SUMMARY OF THE INVENTION

The present inventors have been studying the problem in order to overcome the conventional defects and found the following facts and perfected the method. That is, when fine grain ice or dry (clathrate) water is used for cement mixture, concrete/mortar can be easily manufactured by a small amount of water without the above-mentioned unit. On this occasion, fine grain ice is made in such a manner that water is impregnated into water absorbent polymer, capable of keeping independent fine grains by incorporating water in the structure in the water absorbing state and freezing. And, dry clathrate water is made in such a manner that water is impregnated into the water absorbent polymer.

The method for production of fine grain ice or dry clathrate water for manufacturing of concrete/mortar in the present invention has the following characteristics.

1) Fine grain ice or dry clathrate water particles having stable particle size can be easily manufactured.

2) It is unnecessary to keep fine grain ice at low temperature until it is used and it can be used as it is or by freezing just before mixture.

3) It is unnecessary to manufacture if at a specified place and manufacture can be easily performed at an optional place in free time.

4) The method can be easily applied to an existing ready-mixed concrete plant.

5) Water can be transported as fine particles in places which are impossible to supply with water.

And, the method for the production of concrete/mortar in the present invention has the following characteristics.

1) Low water cement ratio of high strength concrete/mortar can be easily manufactured.

2) Continuous production is easy by extrusion molding and roller molding. And, the products can be easily enlarged in length.

3) Since water absorbent polymer is mixed in with the cement, a remarkable effect can be realized in the prevention of surface dew condensation and efflorescence.

BRIEF DESCRIPTION OF THE DRAWINGS

FIG. 1 is a view for showing a glass transition point of each monomer; and

FIG. 2 is a view for showing the result of evaluation of water absorbent polymer in the examples 1 through 6 and the comparison examples 1 through 3.

DESCRIPTION OF THE PREFERRED EMBODIMENTS

Water absorbent polymer for use in the present invention is obtained in such a manner that acrylic copolymer is dissolved in aliphatic hydrocarbon, acrylic acid and its alkali metalic salt aqueous solution are dispersed, polymerization is performed by W/O type suspension polymerization method and crosslinking is performed in the presence or absence of inorganic compound by means of crosslinking agent to dry.

Acrylic copolymer to be used as dispersing agent when water absorbent polymer for use in the present invention is manufactured is copolymer in which the following are the components.

(a) alkyl acrylates or alkyl methacrylates, monomers in which the carbon number of alkyl groups is 8 or more than 8 are 40–95 weight percent (b) one kind or more than one kind of monomers selected from among acrylic acid derivatives or methacrylic acid derivatives or acrylic amide derivatives or methacrylic amide derivatives containing carboxyl group, amino group, quaternary ammonium group or hydroxyl group are 5–40 weight percent (c) unsaturated monomers capable of copolymerizing with the above-mentioned (a), (b) are 0–40 weight percent Alkyl acrylates or alkyl methacrylates in the component (a) are available if the carbon number of alkyl groups is 8 or more than 8 and monomers which are on sale and available easily are 2-ethylhexyl acrylate, 2-ethylhexyl methacrylate, lauryl acrylate, lauryl methacrylate, tridecyl acrylate, tridecyl methacrylate, mixture of lauryl acrylate and tridecyl acrylate, stearyl acrylate, stearyl methacrylate and the like.

In case where the component (a) is selected, the higher a glass transition point is, the harder to occur beads blocking is when dispersing agent is synthesized in O/W type suspension polymerization. Therefore, it is convenient. A glass transition point of each monomer will be shown in FIG. 1.

For instance, 2-ethylhexyl methacrylate, lauryl acrylate, mixture of lauryl acrylate and tridecyl acrylate, tridecyl acrylate, stearyl acrylate, stearyl methacrylate and the like are available.

Acrylic acid derivatives or methacrylic acid derivatives or acrylic amide derivatives or methacrylic amide derivatives containing carboxyl group, amino group, quaternary ammonium group or hydroxyl group in the component (b) are acrylic acid, methacrylic acid, itaconic acid, dimethylaminoethyl acrylate, dimethylaminoethyl methacrylate, diethylaminoethyl acrylate, diethylaminoethyl methacrylate, acryloyloxyethyltrimethylammonium chloride, methacryloyloxyethyltrimethylammonium chloride, 2-hydroxyethyl acrylate, 2-hydroxyethyl methacrylate, 2-hydroxypropyl acrylate, 2-hydroxypropyl methacrylate, acrylamide, dimethylacrylamide, dimethylaminopropylacrylamide, dimethylaminopropylmethacrylamide, acrylamidopropyltrimethylammonium chloride, methacrylamidepropyltrimethylammonium chloride and the like.

Monomers in the component (c) are alkyl methacrylates in which a glass transition point is high, having affinity with aliphatic hydrocarbon solvent and the monomers in which the carbon number of alkyl group is less than 5 and vinyl acetate are given. For instance, methyl methacrylate, ethyl methacrylate, isopropyl methacrylate, n-butyl methacrylate, isobutyl methacrylate and vinyl acetate are mentioned and methyl methacrylate, ethyl methacrylate and isobutyl methacrylate are proper.

The constitution ratio of the components (a), (b) and (c) largely influences dispersion solubility in the aliphatic hydrocarbon solvent, colloid dispersibility of polymerization and properties of the water absorbent polymer, for instance, water absorbency, particle independence when water is absorbed, particle strength and particle size.

In general, component (a) is 40-95 weight percent, component (b) is 5-40 weight percent and component (c) is 0-40 weight percent as a good value. It is better that component (a) is 45-70 weight percent, component (b) is 5-25 weight percent and component (c) is 20-40 weight percent. In case where component (a) is less than 40 weight percent, the dispersion solubility in the solvent is lowered. In case where component (a) is more than 95 weight percent, the colloid dispersibility relatively gets worse when component (b) is less than 5 weight percent. In both cases, it is difficult to continue W/O type suspension polymerization. (a) has a tendency such that the higher the percentage by weight is in the range between 40 and 95, the better the dispersion solubility in the solvent, particle independence of water absorbent polymer when water is absorbed and particle strength get. In case where component (b) is less than 5 weight percent, the colloid dispersibility gets worse as described before. In case where component (b) is more than 40 weight percent, the dispersion solubility in the solvent is lowered. In both cases, it is difficult to continue W/O type suspension polymerization.

The component (b) has a tendency such that the higher the percentage by weight is in the range between 5 and 40, the better the colloid dispersibility of polymerization is and the more the water absorbing rate of the water absorbent polymer accelerates. On the contrary, in this case, the particle independence when water is absorbed and the particle strength are lowered and the particle size becomes fine. In the case where component (c) is more than 40 weight percent, ratio of the component (a) is relatively lowered and the dispersibility to solvent gets worse. The higher the percentage by weight is in the range between 0 and 40, the higher the particle strength of water absorbent polymer is.

Acrylic copolymer which is used as dispersing agent in the present invention is synthesized by means of an O/W type suspension polymerization method. In solution polymerization, there are a few cases where solvent remains or the function as dispersing agent is inferior by low molecular weight polymer. The example of O/W type suspension polymerization method is as follows. That is, partial saponified polyvinyl alcohol is heated and dissolved in ion exchange water, after the atmosphere is replaced with $N_2$, the solution in which initiator of azo type or peroxide type is dissolved in dropped and dispersed in the monomer of components (a), (b), (c) and the polymerization is completed by keeping heating. After cooling, solid matter is filtered and washed and beads-like acrylic copolymer, that is, dispersing agent is obtained by drying under reduced pressure.

The dispersing agent obtained by the above-described method is dispersed and dissolved in the aliphatic hydrocarbon solvent of W/O type suspension polymerization. The quantity of dispersing agent is used in the 0.1 to 10 weight percent range to acrylic acid and its alkali metalic salt monomer and the better range is 0.5 to 5 weight percent. When the quantity of dispersing agent is less than 0.1 weight percent, the colloid dispersibility of polymerization is labilized. When it is more than 10 weight percent, the fineness of particle size becomes the factor of an economic demerit.

Acrylic acid and its alkali metallic salt aqueous solution for use in the present invention is adjusted in such a manner that acrylic acid monomer is partially neutralized by means of aqueous solution such as sodium hydroxide and potassium hydroxide. It is better in consideration of water absorbency power and safety that the degree of neutralization is 60 to 85%. And, the concentration of monomer in aqueous solution is 35 to 75 weight percent and the preferred concentration is 40 to 70 weight percent.

In the present invention, it causes no difficulty that unsaturated monomer capable of copolymerizing with acrylic acid and its acrylic acid alkali metalic salt monomer is copolymerized with acrylic acid and its acrylic acid alkali metallic salt monomer in the range of the manufacture of water absorbent polymer.

In the case where acrylic acid is polymerized with its alkali metallic aqueous solution by W/O type suspension polymerization method in the present invention, the initiator is of the self-crosslinking type in which cross-linking agent monomer isn't used. Therefore, the preferred initiator is water soluble persulfate such as potassium persulfate and ammonium persulfate and hydrogen peroxide. The quantity of initiator for use is 0.1 to 2.0 weight percent to monomer and the better quantity is 0.2 to 1.0 weight percent.

Aliphatic hydrocarbon solvents of W/O type suspension polymerization in the present invention is aliphatic hydrocarbon such as n-pentane, n-hexane, n-heptane and n-octane, alicyclic hydrocarbon such as cyclohexane, methylcyclohexane and decalin. The preferred one is n-hexane, n-heptane and cyclohexane.

When the water absorbent polymer is manufactured for the present invention, the other important factor is that cross-linking reaction is performed by means of cross-linking agent in the presence or in the absence of inorganic compound after W/O type suspension polymerization.

It is available that the cross-linking agent for use in the present invention is the compound having two or more than two functional groups capable of reacting with a carboxyl group (or carboxylate group). Such cross-linking agent is a polyglycidyl ether such as ethylene glycol diglycidyl ether, polyethylene glycol diglycidyl ether and glycerin triglycidyl ether, haloepoxy compounds such as epichlorohydrin and $\alpha$-methyl chlorohydrin, a kind of polyaldehyde such as glutaraldehyde and glyoxal and the like. The preferred one is ethylene glycol glycidyl ether.

The amount of additive of cross linking-agent differs based on the kind of cross linking agent and kind of dispersing agent and the proper range is usually 0.05 to 2 weight percent to acrylic acid and its alkali metalic salt monomer. When the quantity of the above-described cross-linking agent for use is less than 0.05 weight percent, the particle independence when water is absorbed and the particle strength are bad. When it is more than 2 weight percent, the cross-linking density is too high. Therefore, the water absorbency is remarkably lowered.

In case of cross-linking reaction, the particle independence when water is absorbed rises all the more by adding the inorganic compound. Inorganic compound is, for instance, white carbon, talc, hydrotalcite, pulverized silica (commercially available under the trademark "Aerosil" made by NIPPON AEROSIL KABUSHIKI KAISHA). On this occasion, it causes no difficulty that surface active agent is added. And, well-known non-ionic surface active agents and the like are used.

The method of cross-linking reaction is to add cross-linking agent during azeotropic distillation away and heating and drying under reduced pressure as is well-known and the addition during azeotropic distillation is easy.

The water absorbent polymer for use in the present invention is different from commercially produced polymer and shows particle independence when water is absorbed. The more the component (a) of acrylic copolymer as dispersing agent is and the more cross-linking agent is, the more effects are observed. It can therefore be presumed that slippage of water absorbed polymer concerns the above-described particle independence. The component (a) of dispersing agent upgrades the water repellency of the water absorbed polymer and by upgrading the cross-linking rate of polymer, cross-linking agent increases water absorbing rate and decreases surface tacking. By these effects, the water absorbed bead-like polymer particles slip past each other, become porous and the particles appear independent and flowable since water, as a binder, is low.

Fine grain ice for production of concrete/mortar in the present invention is obtained in a manner such that the above-mentioned water absorbent polymer absorbs necessary quantity of water to freeze so as to keep independent fine grains. It is easily manufactured. Water can be absorbed up to the water absorbency of polymer (100 to 200 times of water absorbent polymer weight in ion exchange water). And, dry clathrate water for production of concrete/mortar is obtained only in such a manner that the above-mentioned water absorbent polymer absorbs the necessary quantity of water. It is desirable that the amount of water to be absorbed is less than half of the water absorbency of polymer in order to keep independent fine grains.

The particle size of fine grain ice or dry clathrate water can be freely varied in the 0.03 to 3.0 mm range by changing the particle size of water absorbent polymer and the amount of water to be absorbed and can be selected in accordance with working conditions when the cement is mixed.

Concrete/mortar is manufactured in a manner such that fine grain ice or dry clathrate water of the present invention is mixed with cement or cement and aggregate in powder condition and water is expelled to the outer portion by means of a pressure molding or extrusion molding method so as to cause hydration with surrounding cement.

Thereafter, the production method of the present invention will be concretely explained according to examples. However, the present invention isn't restricted by these examples.

Water absorbency, particle size and particle independence when water is absorbed were obtained by the following operations as shown below.

The value of water absorbency in ion exchange water was obtained in such a manner that dry polymer 0.5 g was dissipated in ion exchange water 1 l, the swelling polymer weight (W) obtained by filtering by means of 80-mesh wire gauze after standing for twenty-four hours was measured and this value was divided by the original dry polymer weight (Wo). That is to say, it was decided that the water absorbency of ion exchange water (g/g) was W/Wo.

The value of the water absorbency of 0.9% salt water was obtained in such a manner that dry polymer 0.2 g was dispersed in 0.9% salt water 60 g, the swelling polymer weight (W) obtained by filtering by means of 100-mesh wire gauze after standing for twenty minutes was measured and this value was divided by the original dry polymer (Wo). That is, it was decided that the water absorbency of 0.9% salt water (g/g) was W/Wo.

The particle size of water absorbent polymer (in dry condition) was measured by means of an automatic grading distribution measuring apparatus CAPA-300 made by HORIBA SEISAKUSHO KABUSHIKI KAISHA by using decanter method. And, it was decided that median on a basis of the area was particle size.

It was decided that the particle size of water absorbed polymer was the average obtained on a basis of the photographing of an optical microscope after ion exchange water 50 cc was added to dry polymer 1.0 g and the polymer absorbed all the water. The particle independence when water was absorbed was judged by the following standard.

○: Each particle is independent and has flowability.
Δ: Each particle is partially dependent and inferior in flowability.

x: Each particle shows gelation dependence perfectly and has no flowability.

The composition examples of dispersing agent (acrylic copolymer) will be shown hereinafter.

THE COMPOSITION EXAMPLE 1

Ion exchange water 150 g was fed in a 500 ml separatory flask equipping an agitator, a reflux condenser, a dropping funnel, a thermometer and a nitrogen gas introduction tube, partially saponified polyvinyl alcohol (GH-23 made by NIHON GOHSEI KAGAKU KABUSHIKI KAISHA) 0.2 g was added as dispersing agent and the atmosphere was replaced with $N_2$ after heating and dissolution.

On the other hand, azobisdimethylvaleronitrile 1.0 g was added to mixture of lauryl acrylate and tridecyl acrylate (LTA made by OHSAKA YUKI KAGAKU KABUSHIKI KAISHA) 32.5 g, hydroxy ethyl methacrylate 10.0 g and methyl methacrylate 17.5 g in a conical flask in advance to dissolve, it was dropped in the above-mentioned separatory flask for one hour under the condition of nitrogen bubbling, it was maintained for 5 hours at 65° C., the reaction was finished, the solid matter was filtered after cooling to wash and to dry under reduced pressure and the bead-like dispersing agent (1) was obtained.

THE COMPOSITION EXAMPLE 2

The bead-like dispersing agent (2) was obtained by operating in the same way as in composition example 1 except using mixture of lauryl acrylate and tridecyl acrylate 25.0 g, methacrylic acid 5.0 g, dimethylaminoethyl methacrylate 5.0 g and methyl methacrylate 17.5 g.

THE COMPOSITION EXAMPLE 3

The bead-like dispersing agent (3) was obtained by operating in the same way as in composition example 1 except using stearyl methacrylate 30 g, dimethylaminopropyl methacrylamide 10.0 g and methyl methacrylate 10.0 g.

The examples of water absorbent polymer will be shown hereinafter.

THE EXAMPLE 1

N-hexane 360.7 g and the dispersing agent (1) 4.32 g were fed in a 1 l separatory flask equipped with an agitator, a reflux condenser, a dropping funnel, a thermometer and a nitrogen gas introduction tube, temperature was raised to 50° C. to disperse and dissolve and the atmosphere was replaced with $N_2$.

On the other hand, acrylic acid 72.0 g was partially neutralized by means of sodium hydroxide 32.2 g dissolved in ion exchange water 103.6 g in a conical flask in advance and potassium persulfate 0.24 g was dissolved in under room temperature. This monomer aqueous solution was dropped in the above-described separatory flask under the condition of nitrogen bubbling at an agitation speed of 300 rpm for an hour. After reflux for two hours, 30% aqueous hydrogen peroxide 0.1 g was added to and polymerization was perfectly finished by continuing reflux for an hour. Thereafter, ethylene glycol diglycidyl ether 0.73 g was added, azeotropic distillation was performed to dry under reduced pressure after filtration and white bead-like polymer was obtained. And, there was little attachment of polymer in the separatory flask.

The obtained dry polymer showed that the water absorbency to ion exchange water was 125 (g/g), the water absorbency to 0.9% salt water was 33 (g/g), the particle size in dry condition was 120 $\mu$m and the particle size when water was absorbed was 480 $\mu$m. And, the particle independence when water was absorbed was shown.

THE EXAMPLES 2 AND 3

White bead-like polymer was obtained by operating in the same way as the example 1 except using the dispersing agent (2), (3) obtained in the composition examples 2, 3 instead of the dispersing agent (1) of the example 1. And, there was little attachment of polymer in the separatory flask.

THE EXAMPLE 4

White bead-like polymer was obtained by operating in the same way as the example 1 except using cyclohexane instead of n-hexane of the example 1. And, there was little attachment of polymer in the separatory flask.

THE EXAMPLES 5-6

White bead-like polymer was obtained by operating in the same way as the example 1 except employing 0.18 g and 1.46 g of ethylene glycol diglycidyl ether rather than 0.73 g in the example 1. And, there was little attachment of polymer in the separatory flask.

THE COMPARISON EXAMPLE 1

White bead-like polymer was obtained by operating in the same way as the example 1 except not adding ethylene glycol diglycidyl ether of the example 1. And, there was little attachment of polymer in the separatory flask.

THE COMPARISON EXAMPLE 2

White powdery polymer was obtained by operating in the same way as the example 1 by using sorbitan monolaurate instead of the dispersing agent (1) of the example 1. And, the attachment of polymer appeared at the wall surface and the agitating blade in the separatory flask.

THE COMPARISON EXAMPLE 3

Commercially available AQUALIC CA-W (made by NIHON SHOKUBAI KAGAKU KOGYO KABUSHIKI KAISHA)

The result of evaluation in the examples 1 through 6 and the comparison examples 1 through 3 will be shown in FIG. 2

The examples of production methods of fine grain ice and concrete/mortar will be shown hereinafter.

THE EXAMPLE A (FINE GRAIN ICE)

Drinking water 100 kg was fed in a 100 l vessel equipped with an agitator and the water absorbent polymer 1.0 kg of example 1 was gradually added during agitation. After water was absorbed, agitation was stopped and the fine grain polymer which absorbed water was ejected to freeze. Then, the frozen polymer became independent fine grain ice by simple mechanical operation and was agitated by a mixer in the following proportioning ratio and mortar was manufactured.

cement:fine grain ice:quartz sand (bone dry) = 100:28:20

This mortar was formed into a plate which was 50 mm wide and 12 mm thick by a vacuum deaeration type extrusion molding machine. Five specimens which was 350 mm long were made by using this plate and bending tension test was performed after curing at room temperature for 14 days. On this occasion, the bending tension strength (kg/cm$^2$) was 185.3, 211.1, 237.2, 191.0 and 177.9 and the average was 200.5 kg/cm$^2$.

THE EXAMPLE B (FINE GRAIN ICE)

After water was absorbed, powder mixture was performed in the following ratio by using frozen fine grain polymer by the same method as the above-described one.

cement:fine grain ice:quartz sand (bone dry) = 100:24:20

Thereafter, the plate which was 50 mm wide and 12 mm thick was formed by means of a vacuum deaeration type extrusion molding machine. The bending tension strength (kg/cm$^2$) of this plate which was cured for 14 days at 20° C. in a room was 249.5, 220.1 and 220.3 and the average was 230.0 kg/cm$^2$.

THE EXAMPLE C (FINE GRAIN ICE)

After water was absorbed, powdery mixture was performed in the following ratio by using the frozen fine grain polymer in the same manner as the above-mentioned to form by a vacuum deaeration type extrusion molding machine.

cement:fine grain ice:quartz sand (bone dry) = 100:32:20

On this occasion, the bending tension strength (kg/cm$^2$) of this plate after curing at 20 c in a room for 14 days was 176.8, 157.0 and 146.1 and the average was 160.0 kg/cm$^2$.

THE EXAMPLE D (DRY CLATHRATE WATER)

Drinking water 50 kg was fed in a 100 l vessel equipping an agitator and water absorbing polymer 1.0 kg was gradually added during agitation. After water was absorbed, agitation was stopped to manufacture dry clathrate water. By using this dry clathrate water, agitation was performed by means of a mixer in the following ratios to manufacture mortar.

cement:dry clathrate water:quartz sand (bone dry) = 100:28:20

The bending test result of the plate manufactured and cured in the same manner as the above-mentioned example A by using this mortar was 218.4, 179.5 and 180.9 and the average was 192.9 kg/cm$^2$.

THE EXAMPLE E (DRY CLATHRATE WATER)

The same method as the example D was performed. The bending test result of the plate in the following ratio was 241.5, 216.8 and 206.3 and the average was 221.5 kg/cm$^2$.

cement:dry clathrate water:quartz sand (bone dry) = 100:24:20

THE EXAMPLE F (DRY CLATHRATE WATER)

The same method as the example D was performed. The bending test result of the plate in the following ratio was 166.3, 147.0 and 146.1 and the average was 153.1 kg/cm$^2$.

cement:dry clathrate water:quartz sand (bone dry) = 100:32:20

The present invention is explained according to the examples hereinbefore. But, the examples described in the present specification are not restricted but exemplified ones. And, the scope of the invention is supported by the attached claims and is not bound by the description of the examples. Accordingly, all of variations and changes belonging to the claims is within the scope of the present invention.

We claim:

1. A method for the production of fine polymer particles containing water in frozen form for the manufacture of concrete/mortar which comprises:
   a. adding water to polymer particles capable of retaining their particulate shape when substantial quantities of water are absorbed therein, said particles being produced by a process which comprises:
      i) forming an acrylic copolymer dispersing agent having an alkyl acrylate or methacrylate monomer having an alkyl group of eight or more carbon atoms main component;
      ii) dissolving said acrylic copolymer of i) in a liquid aliphatic hydrocarbon,
      iii) partially neutralizing an acrylic acid monomer in aqueous solution with an alkali to form an aqueous solution of partially neutralized acrylic acid,
      iv) adding the aqueous alkali solution of partially neutralized acrylic acid of iii) to the solution of acrylic copolymer of ii) and polymerizing the resultant mixture by W/O suspension polymerization,
      v) subjecting the resultant polymer of iv) to cross-linking reaction in the presence of a cross-linking agent and in the presence or absence of a particulate inorganic compound; and
   b. freezing said water-containing particles of a.

2. A method for the production of fine polymer particles containing water in frozen form for the manufacture of concrete/mortar which comprises:
   a. adding water to polymer particles capable of retaining their particulate shape when substantial quantities of water are absorbed therein, said particles being produced by a process which comprises:
      i) forming an acrylic copolymer dispersing agent by copolymerizing:
         a) an alkyl acrylate or methacrylate monomer having an alkyl group of eight or more carbon atoms, in the amount of 40-95 weight percent,
         b) one or more kinds of acrylic or methacrylic acid or amides containing hydrophilic groups, in the amount of 5-40 weight percent,
         c) unsaturated monomers capable of copolymerizing with the above-mentioned (b) and (c), in the amount of 0-40 weight percent,
      ii) dissolving said acrylic copolymer of i) in a liquid aliphatic hydrocarbon,
      iii) partially neutralizing an acrylic acid monomer in aqueous solution with an alkali to form an aqueous solution of partially neutralized acrylic acid, iv) adding the aqueous alkali solution of partially neutralized acrylic acid of iii) to the solution of acrylic copolymer of ii) and polymerizing the resultant mixture by W/O suspension polymerization, v) subjecting the resultant polymer of iv) to cross-linking reaction in the presence of a cross-linking agent and in the presence or absence of a particulate inorganic compound; and b. freezing water containing particles of a..

3. The method for producing fine polymer particles according to claim 2 wherein a) is selected from the group consisting of 2-ethylhexyl acrylate, 2-ethylhexyl methacrylate, lauryl acrylate, lauryl methacrylate, tridecyl acrylate, tridecyl methacrylate, a mixture of lauryl acrylate and tridecyl acrylate, stearyl acrylate and stearyl methacrylate, b) is selected from the group consisting of acrylic acid, methacrylic acid, itaconic acid, dimethylaminoethyl acrylate, dimethylaminoethyl methacrylate, diethylaminoethyl acrylate, diethylaminoethyl methacrylate, acryloyloxyethyltrimethylammonium chloride, methacryloyloxyethyltrimethylammonium chloride, 2-hydroxyethyl acrylate, 2-hydroxyethyl methacrylate, 2-hydroxypropyl acrylate, 2-hydroxypropyl methacrylate, acrylamide, dimethylacrylamide, dimethylaminopropylacrylamide, dimethylaminopropylmethacrylamide, acrylamidopropyltrimethylammonium chloride and methacrylamidopropyltrimethylammonium chloride, and c) is an alkyl methacrylate having a high glass transition point and affinity to aliphatic hydrocarbon solvents in which the carbon number of the alkyl group is less than five or vinyl acetate, the amount of the dispersing agent i) being between 0.1 and 10 weight percent based on the amount of partially neutralized acrylic acid and the degree of neutralization of iii) being between 60 and 85 percent.

4. The method according to claims 1 or 2 wherein the acrylic acid is polymerized in the presence of an initiator in the amount of 0.1 to 2.0 weight percent.

5. The method according to claims 1 or 2 wherein the crosslinking agent is present in the amount of 0.05 to 2 weight percent based on the amount of partially neutralized acrylic acid.

6. The method according to claim 5 wherein the crosslinking agent is a polyglycidyl ether, a haloepoxy compound or a polyaldehyde.

7. The method according to claims 1 or 2 wherein the particulate inorganic material is white carbon, talc, hydrotalcite or pulverized silica.

8. A method for the production of clathrate polymer particles containing water, said particles being suitable for the manufacture of concrete/mortar, which comprises adding water to polymer particles capable of retaining their particulate shape when substantial quantities of water are absorbed therein, said particles being produced by a process which comprises:

i) forming an acrylic copolymer dispersing agent having an alkyl acrylate or methacrylate monomer having an alkyl group of eight or more carbon atoms as main component;

ii) dissolving said acrylic copolymer of i) in a liquid aliphatic hydrocarbon, iii) partially neutralizing an acrylic acid monomer in aqueous solution with an alkali to form an aqueous solution of partially neutralized acrylic acid, iv) adding the aqueous alkali solution of partially neutralized acrylic acid of iii) to the solution of acrylic copolymer of ii) and polymerizing the resultant mixture by W/O suspension polymerization, v) subjecting the resultant polymer of iv) to cross-linking reaction in the presence of a cross-linking agent and in the presence or absence of a particulate inorganic compound.

9. A method for the production of clathrate polymer particles containing water, said particles being suitable for the manufacture of concrete/mortar, which comprises adding water to polymer particles capable of retaining their particulate shape when substantial quantities of water are absorbed therein, said particles being produced by a process which comprises:

i) forming an acrylic copolymer dispersing agent by copolymerizing:

a) an alkyl acrylate or methacrylate monomer having an alkyl group of eight or more carbon atoms, in the amount of 40-95 weight percent, b) one or more kinds of acrylic or methacrylic acid or amides containing hydrophilic groups, in the amount of 5-40 weight percent, c) unsaturated monomers capable of copolymerizing with the above-mentioned (b) and (c), in the amount of 0-40 weight percent, ii) dissolving said acrylic copolymer of i) in a liquid aliphatic hydrocarbon, iii) partially neutralizing an acrylic acid monomer in aqueous solution with an alkali to form an aqueous solution of partially neutralized acrylic acid, iv) adding the aqueous alkali solution of partially neutralized acrylic acid of iii) to the solution of acrylic copolymer of ii) and polymerizing the resultant mixture by W/O suspension polymerization, v) subjecting the resultant polymer of iv) to cross-linking reaction in the presence of a cross-linking agent and in the presence or absence of a particulate inorganic compound.

10. The method for the production of clathrate water according to claim 9 wherein:

a) is selected from the group consisting of 2-ethylhexyl acrylate, 2-ethylhexyl methacrylate, lauryl acrylate, lauryl methacrylate, tridecyl acrylate, tridecyl methacrylate, mixture of lauryl acrylate and tridecyl acrylate, stearyl acrylate and stearyl methacrylate, b) is selected from the group consisting of acrylic acid, methacrylic acid, itaconic acid, dimethylaminoethyl acrylate, dimethylaminoethyl methacrylate, diethylaminoethyl acrylate, diethylaminoethyl methacrylate, acryloyloxyethyltrimethylammonium chloride, methacryloyloxyethyltrimethylammonium chloride, 2-hydroxyethyl acrylate, 2-hydroxyethyl methacrylate, 2-hydroxypropyl acrylate, 2-hydroxypropyl methacrylate, acrylamide, dimethylacrylamide, dimethylaminopropylacrylamide, dimethylaminopropylmethacrylamide, acrylamidopropyltrimethylammonium chloride and methacrylamidopropyltrimethylammonium chloride, and c) is an alkyl methacrylate having a high glass transition point and affinity to aliphatic hydrocarbon solvents in which the carbon number of the alkyl group is less than five or vinyl acetate, the amount of the dipersing agent i) being between 0.1 and 10 weight percent based on the amount of partially neutralized acrylic acid and the degree of neutralization of iii) being between 60 and 85 percent.

11. The method according to claims 8 and 9 wherein the acrylic acid is polymerized in the presence of an initiator in the amount of 0.1 to 2.0 weight percent.

12. The method according to claims 8 or 9 wherein the crosslinking agent is present in the amount of 0.05 to 2 weight percent based on the amount of partially neutralized acrylic acid.

13. The method according to claim 12 wherein the crosslinking agent is a polyglycidyl ether, a haloepoxy compound or a polyaldehyde.

14. The method according to claims 8 or 9 wherein the particulate inorganic material is white carbon, talc, hydrotalcite or pulverized silica.

* * * * *